United States Patent [19]

Sato et al.

[11] 3,873,992

[45] Mar. 25, 1975

[54] MAGNETIC RECORDING SYSTEM WITH REDUCTION OF HIGH FREQUENCY SIGNAL DISTORTION IN VICINITY OF SATURATION LEVEL

[75] Inventors: Fujio Sato; Eisuke Fujimoto; Keisuke Sato; Bunichiro Tanaka, all of Tokyo, Japan

[73] Assignee: Akai Electric Company Limited, Tokyo, Japan

[22] Filed: Jan. 8, 1973

[21] Appl. No.: 321,944

[30] Foreign Application Priority Data

| | | |
|---|---|---|
| Jan. 8, 1972 | Japan | 47-4894 |
| Feb. 11, 1972 | Japan | 47-14481 |
| Feb. 11, 1972 | Japan | 47-14483 |
| Feb. 22, 1972 | Japan | 47-21762 |

[52] U.S. Cl. .......... 360/24, 360/65

[51] Int. Cl. .......... G11b 5/02, G11b 5/45

[58] Field of Search .......... 179/100.2 R, 100.2 K; 360/24, 65

[56] References Cited

UNITED STATES PATENTS

| | | | |
|---|---|---|---|
| 2,697,755 | 12/1954 | Friend | 179/100.2 R |
| 3,300,590 | 1/1967 | Cronin | 179/100.2 K |
| 3,621,151 | 11/1971 | Wood | 179/100.2 R |

*Primary Examiner*—Stanley M. Urynowicz, Jr.
*Assistant Examiner*—Stewart Levy
*Attorney, Agent, or Firm*—Oblon, Fisher, Spivak, McClelland & Maier

[57] ABSTRACT

The amplitude of high level high frequency components of a signal to be recorded on a magnetic recording medium is suppressed in the vicinity of a saturation level of the magnetic recording medium prior to its recording in order to obviate high frequency distortion due to magnetic losses. High fidelity recording of a high level signal containing high frequency components is enabled with little distortion and improved signal-to-noise ratio.

18 Claims, 8 Drawing Figures

MAGNETIC RECORDING SYSTEM WITH REDUCTION OF HIGH FREQUENCY SIGNAL DISTORTION IN VICINITY OF SATURATION LEVEL

BACKGROUND OF THE INVENTION

1. Field Of The Invention

The present invention generally relates to a magnetic recording system suitable for magnetic recording and reproducing apparatus such as a tape recorder, and more particularly to such a system in which high frequency components of a signal to be recorded are properly suppressed so that the distortion produced by such high frequency components in the course of magnetic recording is reduced, thereby enabling magnetic recording of a high level, high frequency signal with little distortion.

2. Description Of The Prior Art

In the field of magnetic recording with a tape recording machine, it is well-known that magnetic characteristics of magnetic components such as a magnetic head and a magnetic recording medium have a great effect on the results of the recording. Considering the magnetic characteristics from a standpoint of the relationship between an input level of a signal applied to such components and an output level of the signal derived therefrom, the characteristics are such that the output level is linearly increased with an increasing input level of the signal of a given frequency or accordingly, an increasing input current flowing through the magnetic head. Once the input level of the signal reaches a particular region, no increase occurs in the obtained output level for a further increase in the input level. Such a condition is called "magnetic saturation" as is well-known in the art. This level of the input signal for which the magnetic saturation begins to appear is referred to as a "saturation level" hereinafter in this specification. As the input level is further increased, the input level is in fact decreased due to various magnetic losses such as eddy current loss and air gap loss in a magnetic tape and self-demagnetization loss therein. This trend is dependent upon the frequency of the input signal and is more pronounced for high frequency signals.

This means that, for large level high frequency components of an input signal to be recorded by tape recorders, a reproduced output level is decreased at those high frequencies, and will have an increased beat produced due to the occurrence of distortion in the signals. Accordingly, a different tone from the original signal due to a change in signal waveforms occurs, resulting in degradation of high fidelity recording.

Such results have been regarded as unavoidable by those skilled in the art and accordingly there have been but few approaches to this problem. One proposal to record high frequency components of a large level signal with little fall in level was that the level of a recording bias signal was variably set depending upon the frequency components of the input signal to be recorded. This proposal was based upon the findings that the highest obtainable input response is changeable depending upon the level of bias signal for a given frequency thereof, and accordingly, high frequency components of the signal exceeding the predetermined frequency were detected and the level of a bias signals was correspondingly controlled for such high frequency components.

Although the proposal was effective for decreasing the reduction in high frequency output, the proposal did not improve the output response or output fall for both a high frequency and a high level input signal.

SUMMARY OF THE INVENTION

Accordingly, one object of this invention, is to change a degree of suppression of the level of the high frequency components according to the magnetic characteristics of the magnetic recording medium in use.

Another object of the present invention is to provide a new and improved unique recording system enabling high fidelity recording of a signal containing high level, high frequency components with little distortion.

It is another object of this invention to provide a new and improved unique recording system in which beats produced between a bias signal and high frequency components of an input signal are minimized.

It is still another object of this invention to provide a new and improved unique recording apparatus enabling high fidelity recording of a signal containing high level high frequency components on a magnetic recording medium having different magnetic characteristics under corresponding optimum conditions.

Briefly, in accordance with this invention, the foregoing and other objects are in one aspect attained by suppressing the amplitude of high level high frequency signal components in the vicinity of the saturation level of the magnetic recording medium prior to its recording.

The present invention can thus confine the output fall inherent in the prior art to the saturation peak of the magnetic characteristics with the result that the output is in fact increased and the occurrence of distortion or beats produced between the bias signal and the high frequency components of the input signal is minimized.

BRIEF DESCRIPTION OF THE DRAWINGS

Other objects and features of this invention will be more fully understood when reference is made to the accompanying drawings, in which like reference numerals and characters designate like or corresponding parts throughout the several views and wherein.

DETAILED DESCRIPTION OF THE PREFERRED EMBODIMENTS

Figure 1:
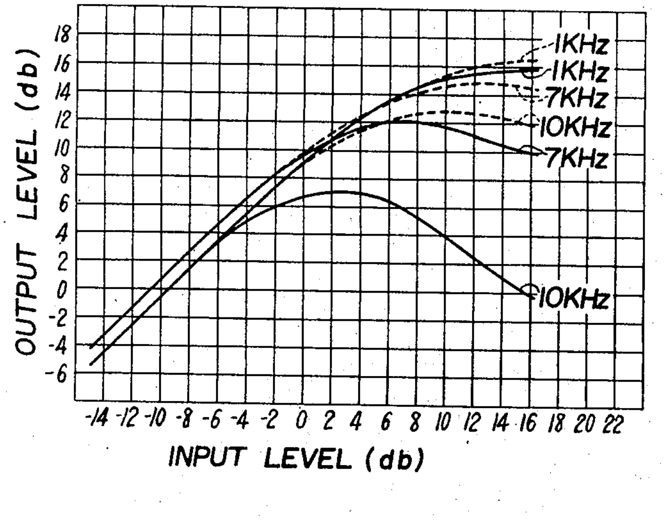
FIG. 1 is a graphical representation of an output voltage derived from an ordinary tape recorder versus an input voltage applied thereto.

Referring now to FIG. 1, an input voltage versus an output voltage of an ordinary tape recorder is shown as being graphically represented for three frequencies of the applied input signal. Magnetic saturation is recognized for each frequency in the drawing and the saturation level or the level of an input signal at which the saturation begins to appear is also seen in the drawing. As the input level is increased into saturation, the output level is gradually decreased due to various magnetic losses above referred to, a best shown for the frequencies of 7KHz and 10KHz in the drawing.

When input signals at the same level are recorded onto magnetic tapes having different magnetic characteristics, reproduction output levels become correspondingly different. Such differences are readily seen from FIG. 1 showing the reproduction output levels for a normal magnetic tape with a solid line and for a special magnetic tape such as so-called "chromium tape," which is mainly made of chromium oxide and has recently been used in the sound recording field, with a dotted line, respectively.

Figure 2:
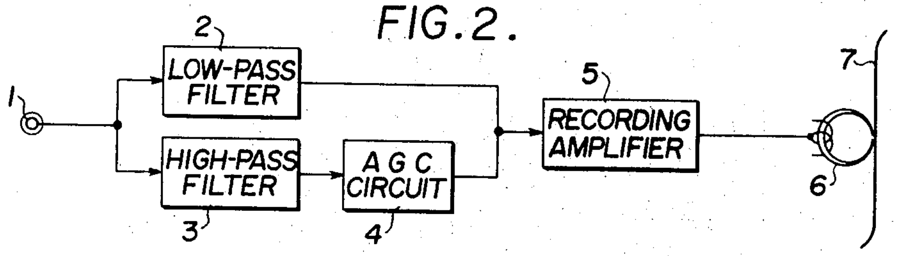
FIG. 2 is a block diagram of a first preferred embodiment of the recording system of this invention.

FIG. 2 schematically shows a first preferred embodiment of a recording system utilizing the present invention.

Referring now to FIG. 2, an input signal to be recorded is applied to an input terminal 1 and hence to a low-pass filter 2 and a high-pass filter 3 from an outside signal source such as a microphone. The input signal is thus divided into low frequency components and high frequency components, and only the latter is passed into a conventional type automatic gain control circuit or an amplitude limiter 4 wherein the level of high frequency components is limited or suppressed in the vicinity of the saturation level of the particular magnetic recording medium in use as shown in FIG. 1. Thus suppressed high frequency components from the AGC circuit 4 are mixed with the other remaining frequency components or the low frequency components and are applied to a magnetic head 6 through a recording amplifier 5 of conventional configuration to be recorded on a magnetic recording medium such as a magnetic tape 7.

The high frequency components of the recorded input signal are thus suppressed in level so that the level does not exceed the saturation level of the recording medium 7, and accordingly, no output fall occurs and high fidelity recording is successfully realized.

While an input signal to be recorded is divided into low and high frequency components in the embodiment above described, the signal may be divided into more frequency bands. Within each band, the highest level is suppressed in the vicinity of the saturation level of the recording medium.

Figure 3:
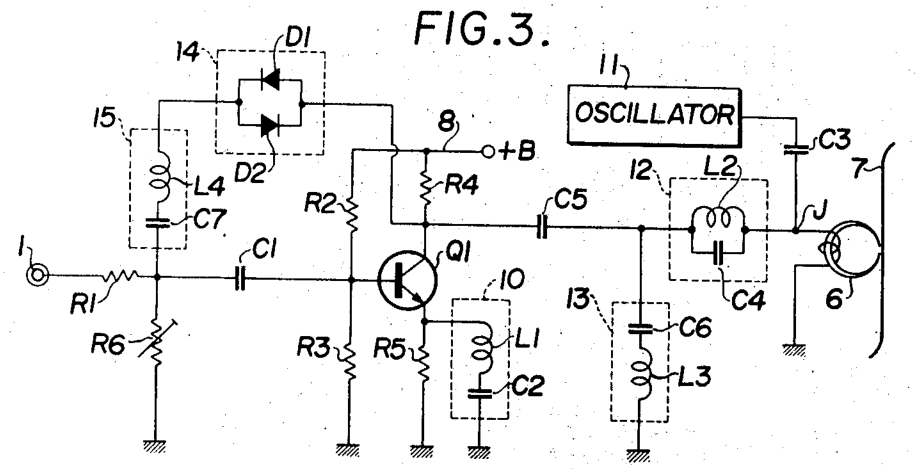
FIG. 3 is a circuit diagram of a second preferred embodiment of the invention.

FIG. 3 shows a circuit diagram of a recording system utilizing the second embodiment of the present invention in which principal parts of a recording amplifier are illustrated.

The input terminal 1 is connected to the base of a transistor Q1 through a resistor R1 and a coupling capacitor C1. The base is supplied with bias voltage through a voltage divider comprising resistors R2 and R3 connected in series between a power supply line 8 supplied by a positive power source +B connected to the base at their junction. The transistor Q1 has a collector connected to the power supply line 8 through a load resistor R4 and an emitter connected to ground through a parallel circuit of an emitter resistor R5 and a peaking circuit 10 which consists of a series connection of an inductor L1 and a capacitor C2.

An oscillator 11 which generates a bias signal is coupled through a coupling capacitor C3 to one end of a coil wound on a magnetic head 6 and to a bias trap circuit 12 consisting of a parallel connection of an inductor L2 and a capacitor C4 whose resonant frequency is selected to be equal to the frequency of the bias signal. The bias trap circuit 12 is in turn connected to the collector of the transistor Q1 through another coupling capacitor C5. The other end of the coil of the magnetic head is grounded. An additional bias trap circuit 13 consisting of a series resonant connection of an inductor L3 and a capacitor C6 is connected between the junction of the bias trap circuit 12 and the coupling capacitor C5 and ground, and the resonant frequency of the circuit is also selected to be equal to the frequency of the bias signal.

A gain control circuit comprising a variable impedance circuit 14 and a series resonant circuit 15 is connected between the collector of the transistor Q1 and the junction between the capacitor C1 and the resistor R1 to provide a negative feedback. The variable impedance circuit 14 comprises a pair of diodes D1 and D2 connected in parallel in reversed polarity relation. The resonant circuit 15 comprises an inductor L4 and a capacitor C7 and has a resonant frequency selected in the vicinity of the resonant frequency of the peaking circuit 10 so that the high frequency components of the input signal can only be passed to provide desired suppression thereto. It is noted that the input terminal 1 is connected to ground through a variable resistor R6 which is provided to adjust the level of the signal supplied to the transistor Q1.

In operation, upon application of a sound input signal to be recorded to the input terminal 1, the signal, except for high frequency components, is uniformly amplified over the audio frequency range by the transistor Q1. The high frequency components are highly amplified by means of the peaking circuit 10 to effect high frequency compensation or equalization. This amplified signal is mixed with the bias signal from the oscillator 11 at the junction J and then applied to the coil of the magnetic head 6 for recording the signal on the magnetic tape 7.

The sound signal amplified by the transistor Q1 is negatively fed back to the base thereof only when the level of high frequency components of the signal exceeds that determined by the magnetic characteristics of the magnetic tape 7. Namely, since the variable impedance circuit 14 comprises a pair of diodes D1, D2 arranged as above mentioned, the amplified sound signal can pass through the circuit 14 only if the signal has a level exceeding the conduction level of the diodes whichever polarity the signal has. Only high frequency components of such a passable signal, which are determined by the resonant frequency of the resonant circuit 15, are fed back to the input terminal 1. As is well-known in the art, the bias trap circuits 12 and 13 are intended to prevent the variable impedance circuit 14 from operating in error by the bias signal and the additional bias trap circuit 13 is provided for this purpose.

With the circuit arrangement as above described, the high frequency components of the input signal whose level exceed the predetermined magnitude are suppressed at the proximity of the saturation level of the magnetic recording medium and then superimposed with the bias signal from the oscillator or the bias signal generator 11 and finally recorded through the magnetic head 6 on the magnetic tape 7.

In this way, distortion introduced by the high frequency components is highly reduced and high fidelity recording is realized for high level input signal with little distortion rate. At the same time, beats produced between the high frequency components of the signal and the bias signal are decreased owing to suppression of the high frequency components.

Figure 4:
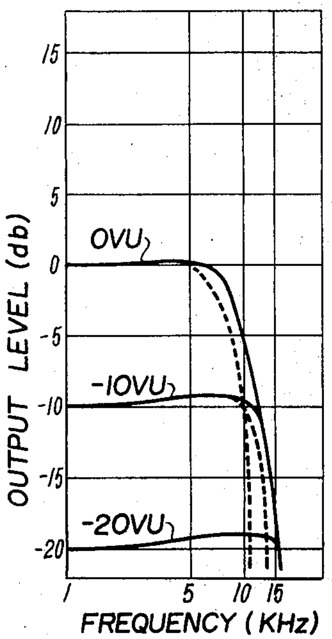
FIG. 4 is a graphical representation of recording versus reproducing characteristics resulting from the recording system according to this invention.
Figure 5:
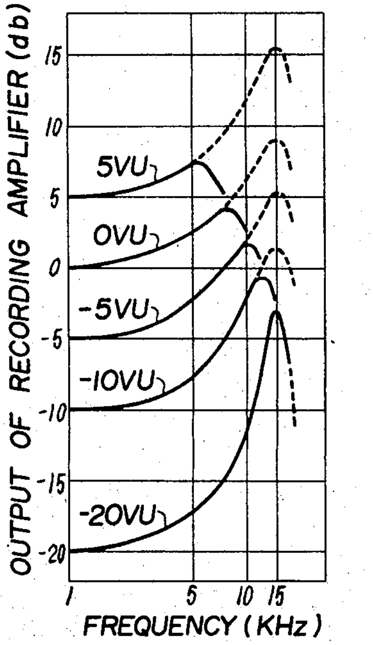
FIG. 5 is a graphical representation of frequency compensation performance or so-called equalization resulting from the recording system according to the invention.

Results obtained from the recording system realized in the embodiment as above described are shown in FIGS. 4 and 5. FIG. 4 shows recording and reproducing characteristics for three input levels, i.e., −20VU, −10VU and 0VU, in which solid lines correspond to the recording system of the present invention and broken lines to that according to the prior art. As clearly seen from the drawing, a higher output is obtained in the higher frequency range in the present recording system than in the conventional recording system for the same level of input signals. FIG. 5 shows high frequency compensation for various input levels for the purpose of comparison, wherein solid lines correspond to the compensation characteristics of the present invention while broken lines correspond to those of the prior art. It is to be noted in the drawing that suppression provided prior to recording is effected in a greater degree for a greater input.

Figure 6:
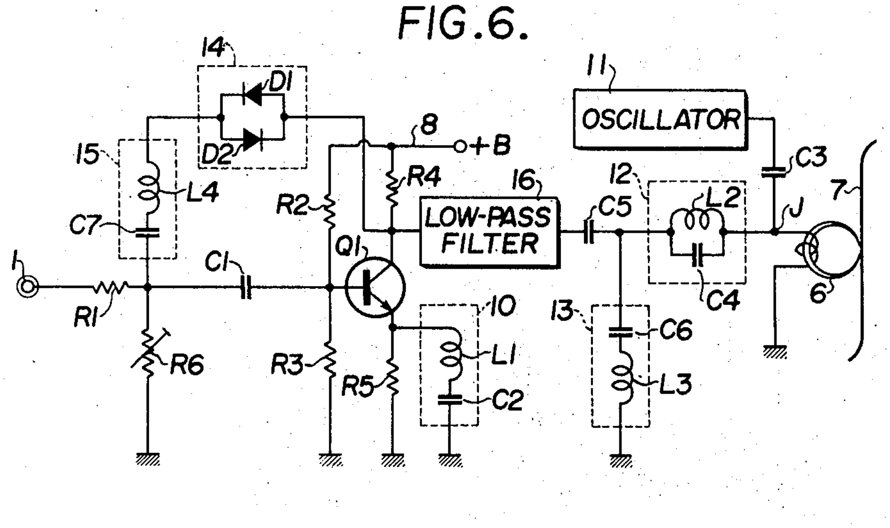
FIG. 6 is a circuit diagram of a third preferred embodiment of the invention.

FIG. 6 illustrates a third preferred embodiment of this invention which is an improvement on the second embodiment shown in FIG. 3. The amplifier as shown in FIG. 6 is of the same configuration as that shown in FIG. 3 except that a conventional low-pass filter 16 is disposed between the collector of the transistor Q1 and the bias trap circuit 12.

It is noted that, if the present invention is embodied in the circuit of FIG. 3, distortion in a different form may be introduced into the output signal due to the non-linear performance of the gain control circuit and more particularly the variable impedance circuit 14. As a result, beats may possibly be incurred which are produced between higher harmonics of such distortion and recording bias signals. In the embodiment of FIG. 6, therefore, the low-pass filter 16 is provided for excluding such higher harmonics from the amplified output signal of the transistor Q1, the harmonics falling out of use or over the audible frequency range. Accordingly, the beats introduced by the higher harmonics are reduced and the amplified output with no such beats is applied to the magnetic head 6 for recording.

Figure 7:
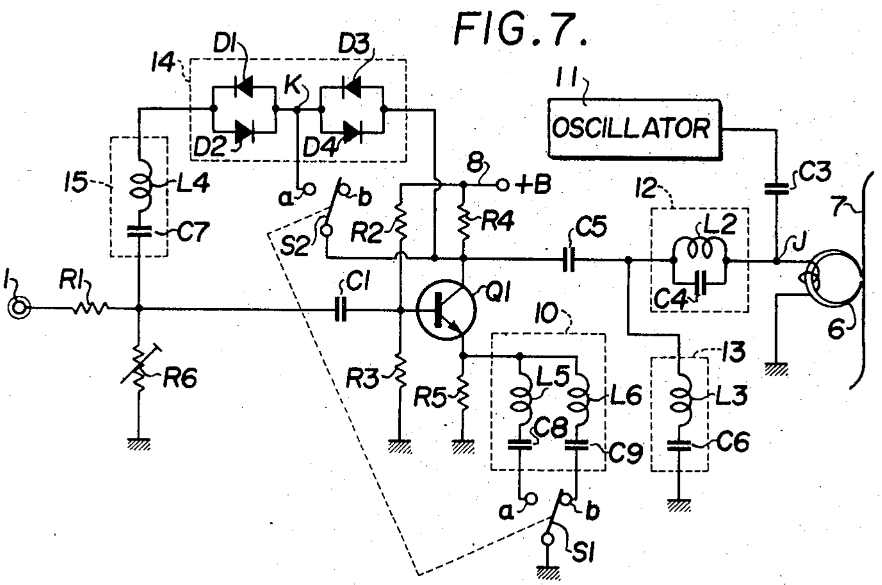
FIG. 7 is a circuit diagram of a fourth preferred embodiment of the invention in which a degree of suppression of high frequency components contained in a recording signal is desirably changeable depending upon the magnetic characteristics of the magnetic recording medium in use.

A fourth preferred embodiment of the invention shown in FIG. 7 is essentially identical to the second embodiment of FIg. 3. However, in the embodiment of FIG. 7, optimum recording is attained according to the kind of magnetic recording medium in use or the magnetic characteristics thereof.

A variable impedance 14 comprises two pairs of diodes D1, D2 and D3, D4, each pair consisting of two diodes parallel-connected in a reverse polarity relation to each other. A peaking circuit 10 includes a first peaking circuit consisting of a series connection of an inductor L5 and a capacitor C8, and a second peaking circuit consisting a series connection of an inductor L6 and a capacitor C9. The peaking circuits can selectively be switched by a switch S1 with contacts *a* and *b* to connect with ground as will be described hereinafter.

A junction K between the two pairs of diodes in the variable impedance circuit 14 is connected to the collector of a transistor Q1 through a switch 52 with contacts *a* and *b*.

With the circuit arranged as above described, optimum suppression of level is provided to the input signal in connection with two kinds of magnetic recording medium, i.e., an ordinary tape and a special tape such as so-called chromium tape.

When an ordinary tape is used for example, the first peaking circuit consisting of the inductor L5 and the capacitor C8 is connected to ground by the switch S1 which has been brought into contact with the contact *a*, and the second diode pair D3 and D4 is shunted by the switch S2 which has been actuated in association with the switch S1. As a result, the first diode pair D1 and D2 is only made effective in the variable impedance circuit 14. It should be noted that the resonant frequency of the first peaking circuit is slected in consideration of the magnetic characteristics of the ordinary tape in use and the diode pair D1 and D2 will serve to provide the most preferable suppression of level to the tape.

On the other hand, when a special tape is in use, the switches S1 and S2 are brought into contact with the contacts *b* so that the second peaking circuit consisting of the inductor L6 and the capacitor C9 is connected to ground and both diode pairs D1, D2 and D3, D4 are made effective in the variable impedance circuit 14. This circuit arrangement provides an optimum high frequency compensation to the special tape by means of the second peaking circuit and applies a smaller suppression in level to the output signal than that applied in the case of an ordinary tape in consideration of the magnetic characteristics thereof.

It is to be understood that, even if more kinds of magnetic recording medium are developed in the art in the future, similar optimum recording can be attained by provision of the switches S1 and S2 having a corresponding number of contacts, selective peaking circuits and circuit gains corresponding to the magnetic characteristics of such mediums.

Although not shown in the drawing, it should be understood that the resonant frequency of the resonant circuit 15 may be made changeable depending upon the magnetic recording medium in use so that more optimum recording can be attained with any particular medium.

Figure 8:
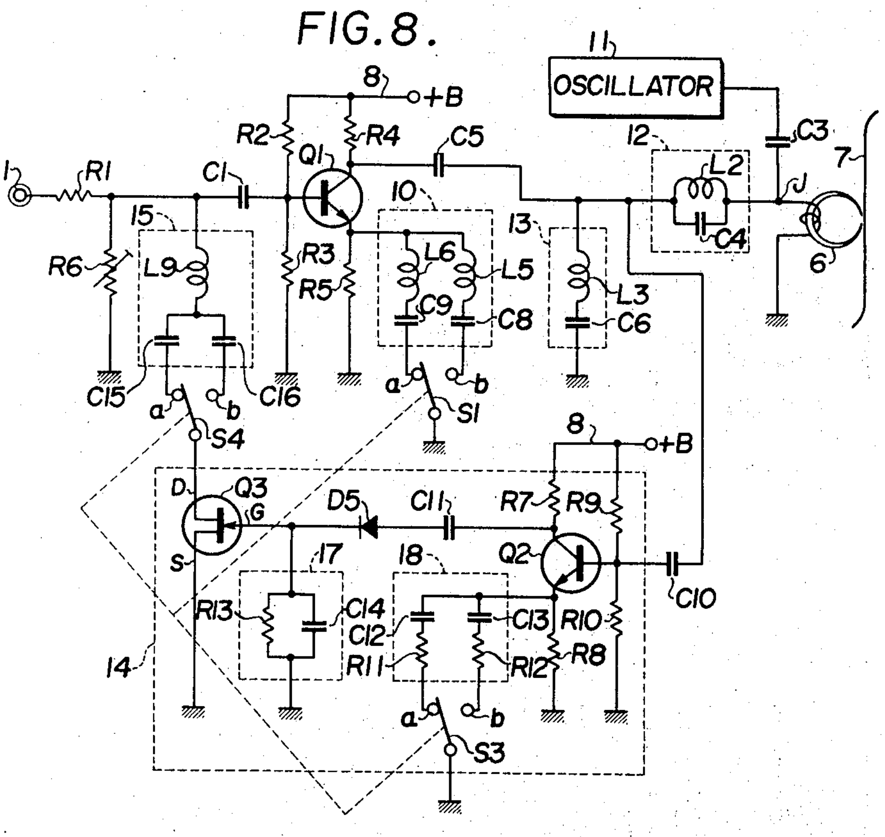
FIG. 8 is a circuit diagram of a fifth preferred embodiment of the invention.

FIG. 8 shows a fifth preferred embodiment of the present invention that is rather different from the embodiments hereinbefore described.

The circuit configuration of this embodiment is, however, substantially the same as that of FIG. 7 but for a variable impedance circuit 14 and a resonant circuit 15. The variable impedance circuit 14 employed in the embodiment includes a transistor Q2 with a base connected to a coupling capacitor C10, a collector connected to a load resistor R7 and an emitter connected with an emitter resistor R8, a diode D5 connected to the collector of the transistor Q2 through a coupling capacitor C11 and a field effect ransistor Q3 in a common source configuration with a gate G connected to the diode D5 and a grounded source S. The base of the transistor Q2 is connected with the intermediate junction of resistors R9 and R10 connected in series between the power supply line 8 supplied by a positive power source +B and ground, so as to supply the transistor Q2 with a bias voltage. The emitter resistor R8 with one end connected to the emitter of the transistor Q2 is grounded at the other end, and is shunted by a booster circuit 18 comprising two parallel-connected series connection of a resistor R11 and a capacitor C12, and a resistor R12 and a capacitor C13, which are adapted to be switched by the switch S3. Between the gate G of the field effect transistor Q3 and ground is connected a smoothing circuit 17 comprising a resistor R13 and a capacitor C14 connected in parallel.

On the other hand, the resonant circuit 15 consists of a series connection of an inductor L9 and parallel-connected capacitors C15 and C16 which have different capacitances. These capacitors 15 and 16 are properly switched by the switch S4 that is arranged to actuate in association with the switches S1 and S3 depending on the kinds of magnetic recording medium.

In operation, the sound input signal amplified by the transistor Q1 is applied to the transistor Q2 through the coupling capacitors C5 and C10. The signal is further amplified with the high frequency components thereof boosted. Such boosting action is provided by the booster circuit 18 in such a way that higher frequency components of the signal are amplified to a greater degree. This is possible because one of the series connections of the boosting circuit 18 has a higher impedance than the other. The switch S3 selects either one of the two series connections R11 and C12 or R12 and C13 of the booster circuit 18 depending upon the magnetic characteristics or kinds of magnetic recording medium.

The amplified sound signal by the transistor Q2 is passed through the coupling capacitor C11 to the diode D5 by which the signal is rectified. After being smoothed by the smoothing circuit 17, the signal is applied to the gate G of the field effect transistor Q3 in the form of a direct current. Since it is generally well-known in the art that a field effect transistor has an impedance between its source and drain thereof which is continuously varied by the d.c. voltage applied to the gate, a negative feedback is provided through the resonance circuit 15 to the transistor Q1 corresponding to the level of d.c. voltage applied to the gate G of the transistor Q3. The switch S4 is interposed in series with the resonance circuit 15 and selects either of the capacitors C15 or C16 according to the kinds of the magnetic recording medium.

With the circuit configuration above referred to, a proper negative feedback is provided corresponding to the level of the high frequency components of the input signal applied to the input terminal 1 and, in particular, a greater suppression is provided to a higher level of the input signal. This enables high fidelity recording of signals with little distortion. In the present example, the beats produced between the bias signal and the high frequency components of the input signal are reduced to a great degree.

Several embodiments have been described in the specification and, in summary, various magnetic losses encountered in the magnetic recording are positively compensated in the recording technique according to this invention to enable high fidelity recording which could not be expected in this kind of recording system in the prior art. In this sense, the present invention is not limited to the several embodiments as above described and may be realized with a recording amplifier incorporating a high frequency compensation circuit in which at least high frequency components of an input signal supplied to a magnetic recording head are suppressed when the level of the components exceed the saturation level of magnetic recording medium in use.

It will be easily understood by those skilled in the art that the present invention is applicable not only to the recording of audio signals but also to the recording of video signals, and it should be understood that the scope of the invention is defined only by the appended claims.

What is claimed as new and desired to be secured by Letters Patent of the United States is:

1. A magnetic recording and reproducing apparatus comprising:

a recording amplifier including at least one element for amplifying a signal containing high frequency components to be recorded on a magnetic recording medium and a peaking circuit connected to said element for providing the amplified signal with high frequency compensation, a gain control circuit connected to said recording amplifier and consisting of a variable impedance circuit whose impedance is decreased when said high frequency components exceed a saturation level of said recording medium and a resonant circuit adapted to resonate at the frequency selected in the vicinity of the resonant frequency of the peaking circuit, whereby the level of high frequency components of the signal is suppressed to the vicinity of a saturation level of the recording medium.

2. A magnetic recording and reproducing apparatus as set forth in claim 1 wherein said amplifying element is a transistor and said gain control circuit is disposed between the collector and the base of said transistor.

3. A magnetic recording and reproducing apparatus as set forth in claim 1 wherein said variable impedance circuit of the gain control circuit comprises one or more pairs of diodes, each pair including two diodes parallelconnected in a reversed polarity relationship to each other, and said resonant circuit comprises a series connection of an inductance and a capacitance.

4. A magnetic recording and reproducing apparatus as set forth in claim 3 wherein an output of said amplifying element is applied to the magnetic recording medium through a low-pass filter for removing high frequency components from the output which fall outside a desired frequency range.

5. A magnetic recording and reproducing apparatus as set forth in claim 1, wherein said peaking circuit includes at least two sets of series connections each comprising an inductance and a capacitance, and said variable impedance circuit of the gain control circuit includes at least two pairs of diodes, each pair comprising two diodes parallel-connected in a reversed polarity relationship to each other, and a switching means for selecting either one of said two sets of series connections and either one of said diode pairs depending upon the magnetic characteristics of the magnetic recording medium.

6. A magnetic recording and reproducing apparatus comprising:

a recording amplifier including at least one element for amplifying a signal containing high frequency components to be recorded on a magnetic recording medium and a peaking circuit connected to said element for providing the thus amplified signal with high frequency compensation, a gain control circuit connected to the output of said recording amplifier and consisting of:

a variable impedance circuit comprising amplifying means connected to the output of said recording amplifier, a rectifying means for rectifying the signal amplified by said amplifying means and a variable impedance means with its one end grounded whose impedance is decreased by the output of said rectifying means only when said high frequency components exceed a saturation level of said recording medium, and a resonance circuit connected between the other end of said variable impedance means and the input of said recording amplifier adapted to resonate at the frequency selected in the vicinity of the resonance frequency of said peaking circuit, whereby the level of high frequency components of the signal is suppressed to the vicinity of a saturation level of the recording medium.

7. A magnetic recording and reproducing apparatus as set forth in claim 6, wherein said amplifying means includes a transistor with its base connected to the output of said recording amplifier and a boosting circuit connected to the emitter of said transistor for amplifying said high frequency components of said signal.

8. A magnetic recording and reproducing apparatus as set forth in claim 6, wherein said peaking circuit includes at least two sets of series connections each comprising an inductance and a capacitance, said resonance circuit includes at least two sets of series connections each comprising an inductance and a capacitance, and a switching means for selecting either one of said two sets of series connections of said peaking circuit and either one of said two sets of series connections of said resonance circuit, depending upon the magnetic characteristics of the magnetic recording medium.

9. A magnetic recording and reproducing apparatus as set forth in claim 8, wherein said boosting circuit includes at least two sets of series connections each comprising a capacitance and a resistance and said switching means selects either one of said two sets of series connections of said boosting circuit in association with the selection of said one of the two sets of series connections of said peaking circuit and said resonance circuit.

10. A method of magnetically recording a signal containing high frequency components on a magnetic recording medium, which comprises the steps of:

amplifying said signal by amplifier means;

separating from the amplified signals only that portion containing high frequency components;

determining when said high frequency components of the amplified signal exceed a saturation level of said recording medium;

negatively feeding back to said amplifier means only when said high frequency components of the amplified signal exceed a saturation level of said recording medium whereby the level of said high frequency components of said signal will be suppressed to the vicinity of said saturation level, and recording the output of said amplifier means on said magnetic medium whereby the high level, high frequency components of said signal will not saturate said magnetic recording medium.

11. The method according to claim 10 further comprising the steps of mixing said output of said amplifier means with the output of a bias frequency oscillator prior to said recording step.

12. The method according to claim 11 further comprising the step of boosting the level of said high frequency components of said signal to effect high frequency compensation thereof.

13. Apparatus for suppressing saturation-causing high level, high frequency components of a signal prior to the recording of said signal on a magnetic recording medium, which comprises:

means for amplifying the portions of said signal having a magnitude below a predetermined saturation level of said recording medium; and means for negatively feeding back to said amplifying means only those portions of said amplified signal which approximate or exceed said predetermined saturation level and a predetermined high frequency whereby the gain of said amplifying means is reduced to thereby prevent high level, high frequency components of said signal from saturating said magnetic recording medium.

14. The apparatus according to claim 13 wherein said negative feedback means comprises variable impedance means connected in series with first resonant circuit means.

15. The apparatus according to claim 14, further comprising a second resonant circuit means connected to said amplifying means for effecting high frequency compensation of said amplified signal.

16. The apparatus according to claim 15 wherein the resonant frequencies of said first and second resonant circuit means are approximately equal.

17. The apparatus according to claim 16 wherein said variable impedance means comprises diode means which is biased into conduction at approximately said predetermined saturation level of said magnetic recording medium and which is not in conduction for signals below said saturation level.

18. The apparatus according to claim 17 wherein said diode means comprises two diodes connected in a parallel, reversed polarity relationship to each other.

* * * * *